April 11, 1950     A. DECLERCQ     2,504,007
BICYCLE TYPE RACING DEVICE
Filed March 12, 1947     2 Sheets-Sheet 1
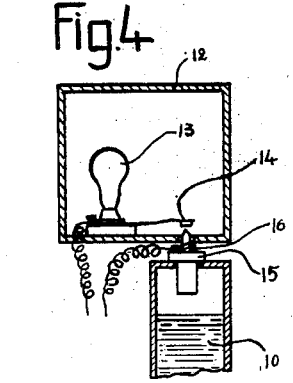
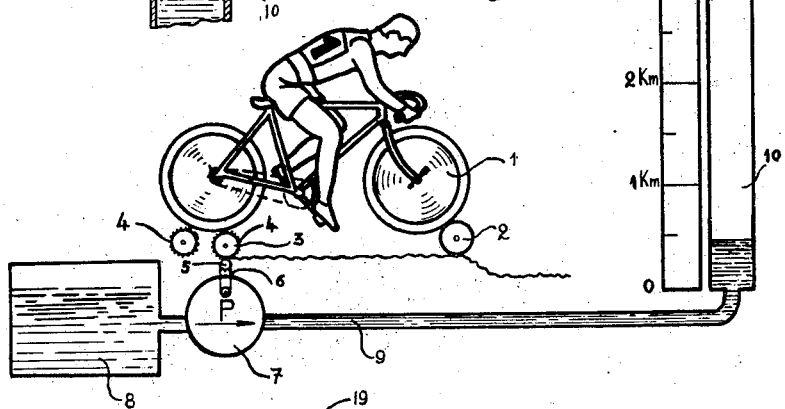
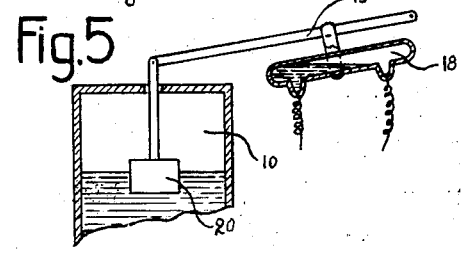
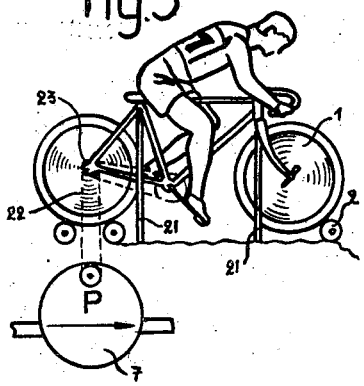
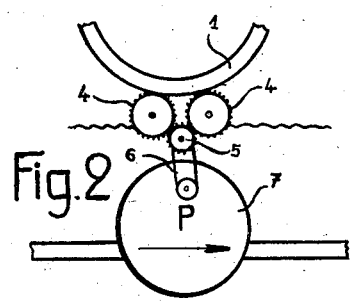
INVENTOR.
AIME DECLERCQ
BY
Haseltine, Lake & Co.
AGENTS.

April 11, 1950     A. DECLERCQ     2,504,007
BICYCLE TYPE RACING DEVICE

Filed March 12, 1947     2 Sheets-Sheet 2

INVENTOR.
AIME DECLERCQ
BY
Haseltine, Lake & Co.
AGENTS.

Patented Apr. 11, 1950

2,504,007

UNITED STATES PATENT OFFICE 2,504,007

BICYCLE TYPE RACING DEVICE

Aimé Declercq, Brussels, Belgium

Application March 12, 1947, Serial No. 734,102
In Belgium March 21, 1946

9 Claims. (Cl. 272—73)

The present invention is relating to an arrangement for cycling competitions on reduced ground, comprising rollers capable of supporting at least one cycle or like vehicle.

The invention has for its object to make arrangements of this kind more spectacular and attractive. It is known to show up the space covered at the periphery of the driving wheel, either by recording it by twisting a cable entailing a pointer to move on a dial, or by moving in a space previously calculated a reduced model of the bicycle, driven by a chain controlled by gears actuated by the rollers or such cycle. These processes have important drawbacks, especially by reason of mechanical accidents which may occur and of the fact that it is rather easy to put voluntarily the mechanism out of order to alter the competition result.

In order to avoid such annoyances, in the arrangement according to the invention, with each cycle are associated a liquid tank, a container, preferably transparent, and a pump controlled by the driving wheel of the cycle and forcing said liquid into the container. This allows a close control of the effort made by the cyclist and, in case of several cycles being provided, of that effort with regard to that of other cyclists using the same apparatus in a same competition.

In an advantageous embodiment of the object of the present invention, the arrangement includes a member moving according to the level of the liquid within the container and actuating, when it reaches a predetermined position, a signalling device.

Other details and characteristics of the invention will be clearly understood by the description of the accompanying drawings which illustrate by way of non-limitative example, a particular embodiment of the arrangement according to the invention.

Fig. 1 is an elevation view, partly in section, of an arrangement according to the invention and comprising one cycle.

Figs. 2 to 5 are detail views.

Like reference numerals indicate like parts throughout the drawings.

Figure 6:
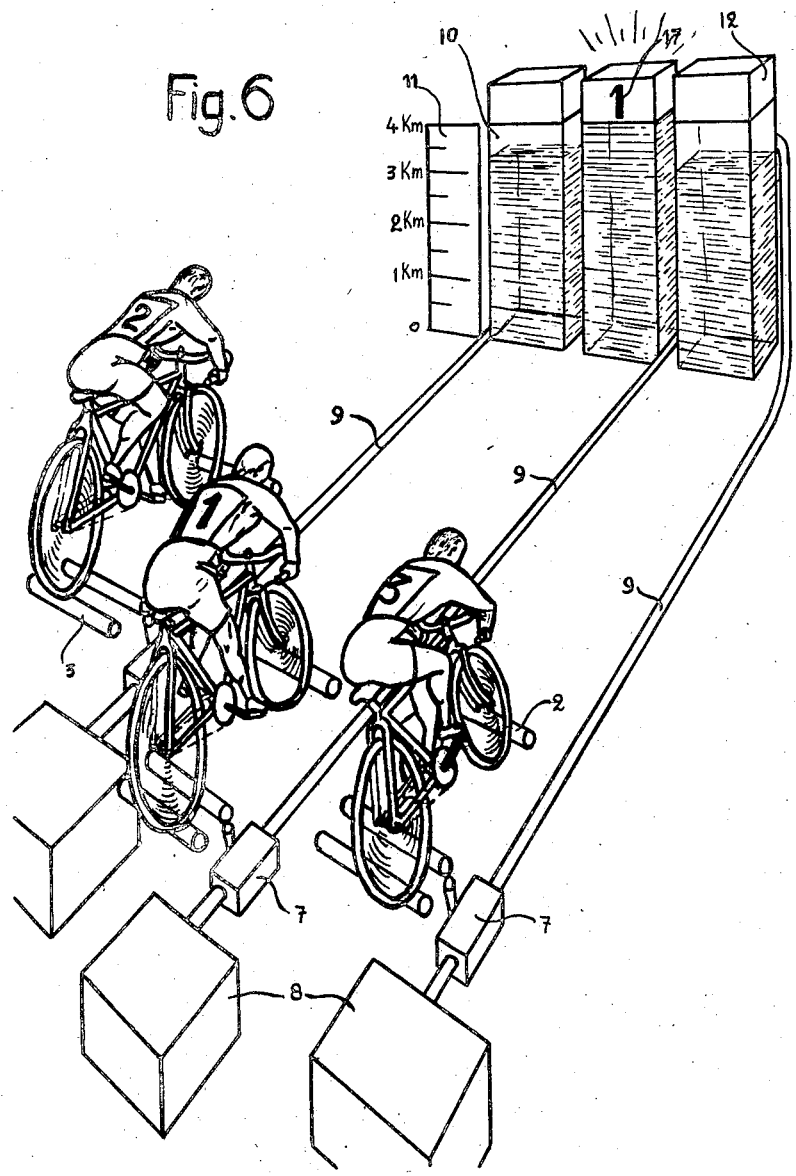
Fig. 6 is a perspective view of the arrangement adapted to several cycles.

Referring to Figure 1, the arrangement comprises rollers 2 and 3 supporting a cycle 1. The rollers 3 carry tooth pinions 4 one of which actuates a gear 5 controlling, for instance by a chain 6, a pump 7. Such pump is supplied by a tank 8 containing a colored liquid, which is forced by the pump through a pipe 9, into a transparent column-shaped container 10.

The pump 7 is a gear pump. It may be driven by both pinions 4 (Figure 2) or by a chain 22 (Fig. 3) controlled by a pinion 23, mounted on the axis of the driving wheel. In the latter case, in order to avoid any vacillating of the cycle, supports 21 are provided fixing in position the frame thereof. When several cycles are provided, all the pumps must have exactly identical outputs. By means of a graduated scale 11 it is possible to state the level of the liquid in the column 10. The indications given thereby show, e. g. in kilometres, the corresponding spaces covered at the periphery of the driving wheel. Above the column is mounted a signalling device formed with a box 12 which may be lightened from inside by a lamp 13, the supply circuit of which comprises a switch 14 (Fig. 4). When the liquid reaches the upper part of the column 10, an element 15 pushes away a spring 16 and closes the switch 14. The box 12 is thus lightened, it may have a number 17 which appears at this moment on a luminous background. The race has then come to its end.

When several racers are in competition, a number or a characteristic sign may be associated with each of them; referring to Fig. 3, the racer with the number "1" has just finished racing. Moreover, liquids of different colors may be used in the various columns. In such a case, a characteristic sign of the corresponding color is associated with each cycle. For instance, a vest may be given to each racer, which has the color of the corresponding liquid.

Instead of liquids of different colors, transparent columns of different colors may be used, with a liquid, for instance colored in white or black, which by rising within the columns, alters the tint thereof.

The switch 14 may be replaced by a mercury contactor 18 (Fig. 5) mounted on an arm 19, and swinging under the action of a float 20, dipped in the liquid of the column 10.

It is to be understood that the invention is in no way limited to the constructional form above described and that many modifications may be made, in particular to the shape, the construction, the number and the arrangement of the parts involved in its construction without departing from the scope of the present application for patent, on condition that these changes fall within the scope of the appended claims. Thus, the luminous box 12 could be replaced by a bell or by a mark rising up when the liquid reaches the top of the column. The gear pump the output of which is progressive could be also replaced by another pump system having the same properties. It is well understood that in case of several cycles, all the pumps must be of exactly identical outputs.

I claim:

1. Arrangement for cycling competitions on reduced ground comprising a vehicle, rollers to support said vehicle, a driving wheel on said vehicle, a liquid tank, colored liquid in said tank, a transparent container, a pump forcing said liquid into said container, means for actuating said pump by said driving wheel, a graduated scale on said container, and marks carried by said scale stating the space covered at the periphery of said driving wheel.

2. Arrangement for cycling competitions on reduced ground comprising a vehicle, rollers to support said vehicle, a driving wheel on said vehicle, a liquid tank, colored liquid in said tank, a transparent container, a pump forcing said liquid into said container, a member moving according to the level of the liquid within said container, a signalling device, a supply circuit for said device, and a switch in said circuit, said switch being controlled by said member.

3. Arrangement for cycling competitions on reduced ground comprising a vehicle, rollers to support said vehicle, a driving wheel on said vehicle, a liquid tank, colored liquid in said tank, a transparent container, a pump forcing said liquid into said container, means for actuating said pump by said driving wheel, a graduated scale on said container, and marks carried by said scale stating the space covered at the periphery of said driving wheel, a member moving according to the level of the liquid within said container, a signalling device, a supply circuit for said device, and a switch in said circuit, said switch being controlled by said member.

4. Arrangement for cycling competitions on reduced ground comprising a vehicle, rollers to support said vehicle, a driving wheel on said vehicle, a liquid tank, colored liquid in said tank, a transparent container, a pump forcing said liquid into said container, means for actuating said pump by said driving wheel, a float provided in said container, a signalling device, a supply circuit for said device, and a mercury contactor in said circuit, said contactor being controlled by said float.

5. Arrangement for cycling competition on reduced ground comprising several vehicles, rollers to support said vehicles, a driving wheel on each vehicle, a liquid tank, colored liquid in said tank, a transparent container for each vehicle, a pump for each vehicle forcing the liquid in the corresponding container, means for actuating each pump by corresponding driving wheel, a member moving according to the level of the liquid within each container, a signalling lamp corresponding to each container, a supply circuit for said lamp, and a switch in said circuit, said switch being controlled by said member, and a number associated with the corresponding vehicle and shown by said lamp, on actuating.

6. Arrangement for cycling competition on reduced ground comprising several vehicles, rollers to support said vehicles, a driving wheel on each vehicle, a liquid tank for each vehicle, a transparent container for each vehicle, a pump for each vehicle forcing the liquid in the corresponding container, means for actuating each pump by the corresponding driving wheel, liquids of different colors in said tanks, and a sign characteristic associated with each vehicle and of the color of the corresponding liquid.

7. Arrangement for cycling competition on reduced ground comprising several vehicles, rollers to support said vehicles, a driving wheel on each vehicle, a liquid tank for each vehicle, a transparent container of different color for each vehicle, a colored liquid in all the tanks, said liquid having a tint different of that of those colors, a pump for each vehicle forcing the liquid in the corresponding container, means for actuating each pump by the corresponding wheel, and a sign characteristic associated with each vehicle and of the color of the corresponding container.

8. Arrangement for cycling competition on reduced ground comprising several vehicles, rollers to support said vehicles, a driving wheel on each vehicle, a liquid tank for each vehicle, a transparent container for each vehicle, liquid of different colors in said tanks, a sign characteristic associated with each vehicle and of the color of the corresponding liquid, a member moving according to the level of the liquid within each container, a signalling lamp corresponding to each container, a supply circuit for said lamp, and a switch in said circuit, said switch being controlled by said member, and a number associated with the corresponding vehicle and shown by said lamp, on actuating.

9. Arrangement for cycling competition on reduced ground comprising several vehicles, rollers to support said vehicles, a driving wheel on each vehicle, a liquid tank for each vehicle, a transparent container of different color for each vehicle, a colored liquid in all the tanks, said liquid having a tint different of that of those colors, a pump for each vehicle forcing the liquid in the corresponding container, means for actuating each pump by the corresponding driving wheel, a sign characteristic associated with each vehicle and of the color of the corresponding container, a member moving according to the level of the liquid within each container, a signalling lamp corresponding to each container, a supply circuit for said lamp, and a switch in said circuit, said switch being controlled by said member, and a number associated with the corresponding vehicle and shown by said lamp, on actuating.

AIMÉ DECLERCQ.

REFERENCES CITED

The following references are of record in the file of this patent:

UNITED STATES PATENTS

| Number | Name | Date |
| --- | --- | --- |
| 581,835 | Sturgis | May 4, 1897 |
| 747,294 | Blaisdell | Dec. 15, 1903 |
| 985,338 | Gans et al. | Feb. 28, 1911 |

FOREIGN PATENTS

| Number | Country | Date |
| --- | --- | --- |
| 180,762 | Sweden | Nov. 15, 1935 |